Figure 3:
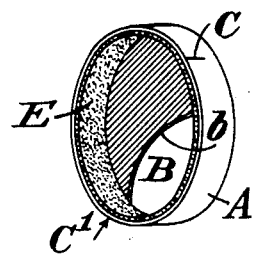

R. G. DIGWEED.
MULTIPLE EXPOSURE ATTACHMENT FOR CAMERAS.
APPLICATION FILED MAY 31, 1913.
1,068,862.  Patented July 29, 1913.
*Fig. 4.*
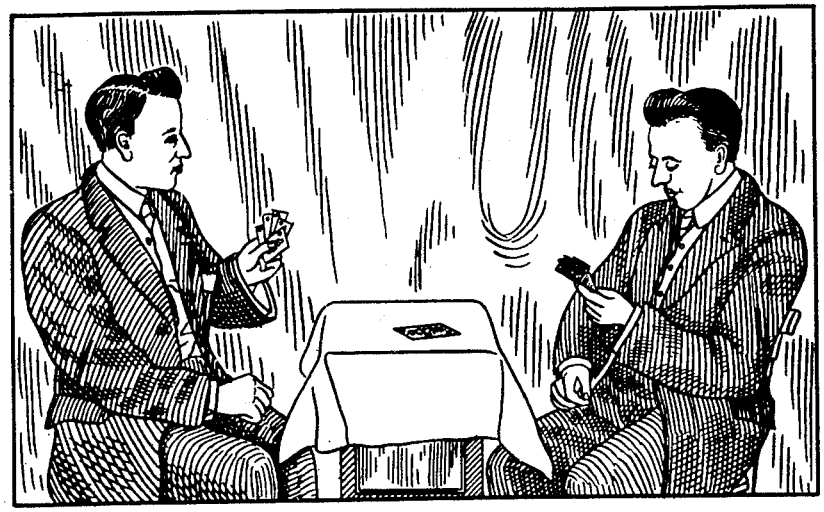
*Fig. 1.*  *Fig. 2.*
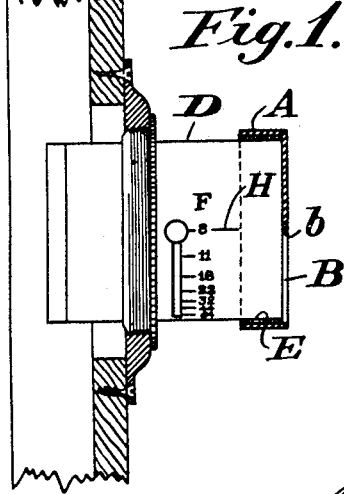 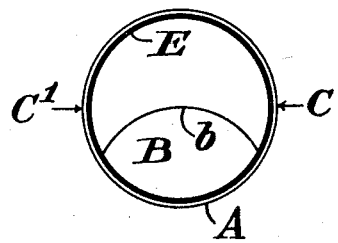
Witnesses
Mary D. Swoot
Grace P. Brereton Inventor
Richard G. Digweed
By Sturtevant Mason
attys.

UNITED STATES PATENT OFFICE.

RICHARD GEORGE DIGWEED, OF LIVERPOOL, ENGLAND, ASSIGNOR OF ONE-HALF TO JOHN PERCY JONES, OF LIVERPOOL, ENGLAND.

MULTIPLE-EXPOSURE ATTACHMENT FOR CAMERAS.

1,068,862.  Specification of Letters Patent.  Patented July 29, 1913.

Application filed May 31, 1913. Serial No. 771,045.

*To all whom it may concern:*

Be it known that I, RICHARD GEORGE DIGWEED, subject of the King of Great Britain, residing at Liverpool, in the county of Lancaster, in the Kingdom of England, have invented a certain new and useful Multiple-Exposure Attachment for Cameras, of which the following is a specification.

The invention relates more particularly to multiple exposure attachments which are connected to the mount for the lens so that said attachment may be rotated for producing a composite negative, wherein different sections of the composite picture are produced by successive exposures.

An object of the invention is to provide an attachment of the above character, in which the opening is so constructed that a uniform diffusion of the two pictures on the one plate at the point of meeting is secured.

In the accompanying drawings:—Figure 1 is a sectional plan view of a camera lens mount with my invention applied thereto; Fig. 2, a rear view of the lens cap separate from the lens mount; Fig. 3 is a perspective view of the lens cap; and Fig. 4 is a view showing the first and second exposures, and illustrates how one exposure merges into the other without any sharp line of demarcation across the middle of the photograph.

According to the preferred method of carrying this invention into practice, a lens cap A is taken, which in the drawing consists of a disk bounded by a lateral flange. A section is cut out of this disk or front portion of the cap, so as to leave an opening B, whose arc shaped boundary line $b$ passes through the optical axis of the lens. The curvature of the boundary line is the same as that of the boundary of the lens, so that approximately about a third part of the front face of the cap is cut away, leaving the un-cut part in the form of a thick crescent. A mark C is made upon the cylindrical surface of the cap immediately vertically above the center of the cap when the cut out portion D lies in a vertical position. The cap A itself is made as an ordinary lens cap, but with the part B cut out. It should fit accurately the lens mount D and is made of some non-actinic substance preferably painted dead black with a velvet lining E inside.

In use the device is employed as follows:—The cap A is placed over the front of the lens mount D with the mark C on its cylindrical surface exactly above the center of the lens and opposite the mark H on the lens mount. If an ordinary lens cap is to be employed this is placed over the device A. The sitter is posed in one of the two positions shown in Fig. 4, and an exposure made either by the ordinary lens cap or by the shutter, then the lens cap is replaced, and the sitter re-posed so as to occupy the other of the two positions shown in Fig. 4. The device A is turned around so that another center mark at C' comes opposite the center mark H on the lens mount, and the cut away portion lies opposite to the other half of the lens, thereby shielding the first exposure. The exposure is then repeated. It is found by this method of procedure, the exposures in the two cases being the same, that a photograph is obtained in which the sitter in the two positions appears upon a single plate with no boundary line between them and admits of taking the identical sitter, not reflections, in any position and in any light. The opening B fully exposes one part of the plate at the first exposure, and graduates the exposure of the other part, and when the cap A is turned around, its opening fully exposes the unexposed part, and graduates the already exposed part. A good sharp photograph is thus produced, and the arc shaped boundary line in conjunction with the convexity of the front face of the lens, acts to produce a uniform diffusion of the two pictures on one plate, at the place of meeting.

Of course the device may be made in any suitable form of diaphragm either in the form of a lens cap or a slide, and either in front or behind the lens. The term "cap" is therefore used hereinafter as defining broadly a slide, diaphragm, or other form of shutter. The above described curve $b$ is found to give the best results.

I declare that what I claim is:—

A multiple exposure attachment for cameras, comprising a cap adapted to be rotatably supported on the mount for the lens, said cap having a section cut out from its front face forming an opening having an arc-shaped boundary line passing through the optical axis of the lens, said arc-shaped boundary line acting in conjunction with the convexity of the front surface of the lens to produce a uniform diffusion of the pictures on the plate at the place of meeting.

In witness whereof, I have hereunto signed my name this 21st day of May, 1913, in the presence of two subscribing witnesses.

RICHARD GEORGE DIGWEED.

Witnesses:
G. C. DYMOND,
G. H. HOYLE.